United States Patent [19]

Satoh

[11] 4,398,220
[45] Aug. 9, 1983

[54] CIRCUIT FOR DETECTING THE OPERATIONAL STATE OF A TELEVISION RECEIVER

[75] Inventor: Tatsuaki Satoh, Kumagaya, Japan

[73] Assignee: Tokyo Shibaura Denki Kabushiki Kaisha, Kawasaki, Japan

[21] Appl. No.: 286,674

[22] Filed: Jul. 24, 1981

[30] Foreign Application Priority Data

Sep. 5, 1980 [JP] Japan .................................. 55-123006
Sep. 5, 1980 [JP] Japan .................................. 55-123007
Sep. 5, 1980 [JP] Japan .................................. 55-123008

[51] Int. Cl.³ ............................................. H04N 5/50
[52] U.S. Cl. .................................. 358/188; 358/139; 358/10; 358/198
[58] Field of Search .............. 358/10, 139, 188, 191.1, 358/192.1, 198

[56] References Cited

U.S. PATENT DOCUMENTS 2,632,800  3/1953  Schlesinger .
2,910,530 10/1959  Clark ................................. 358/192.1
3,518,365  6/1970  Chaddha ........................... 358/192.1
4,025,953  5/1977  Sideris .............................. 358/191.1
4,038,689  7/1977  Rzeszewski ...................... 358/191.1
4,340,908  7/1982  Wakabayashi ..................... 358/188

OTHER PUBLICATIONS

Abstract No. DT 2741-506.

Primary Examiner—Michael A. Masinick
Attorney, Agent, or Firm—Schuyler, Banner, Birch, McKie & Beckett

[57] ABSTRACT

The present invention comprises a tuning detecting circuit, a synchronization detecting circuit, an audio noise detecting circuit, a logic circuit and a muting circuit. According to the present invention, a tuning detecting circuit detects the tuning state (i.e., proper tuning, mistuning and slight mistuning) of the local oscillator. The tuning detecting circuit receives a pair of oppositely phased signals (AFT1, AFT2) from an automatic fine tuning circuit, and generates an output signal indicative of the tuning state of the local ascillator. A synchronization detecting circuit, receiving synchronizing signals and flyback pulses, determines whether the synchronization is maintained; this circuit generates an output signal indicative of the synchronization of the synchronizing signals and the flyback pulses. An audio noise detecting circuit receiving an audio intermediate frequency (IF) signal, detects whether the IF signal includes a noise component, and generates an output signal indicative of the presence of noise. A logic circuit receives the output signals from the tuning, synchronization and audio noise detecting circuits. Depending on the operational states, the logic circuit generates either a first output signal, a second output sign, or a third output signal indicative of the operational states.

8 Claims, 7 Drawing Figures

CIRCUIT FOR DETECTING THE OPERATIONAL STATE OF A TELEVISION RECEIVER

BACKGROUND OF THE INVENTION

This invention relates to a television receiver, and more particularly, a circuit for detecting and improving its operation state.

In a television receiver, proper measures need to be taken against various undesirable operational states, such as, mistuning of the local oscillator which controls channel selection, nonsynchronization of either the vertical or horizontal scanning signals with the synchronizing signal, and excessive noise. For example, it is desirable to indicate to a user the receiving condition of a tuner, the non-synchronization of the scanning signals and to permit the user to correct such conditions. It is also desirable to automatically mute the loudspeaker when a noise signal is superimposed on the audio signal.

SUMMARY OF THE INVENTION

Accordingly, an object of the present invention is to provide a circuit for detecting and improving the operational states of a television receiver.

Another object of the present invention is to provide a circuit which drives certain light-emitting devices to indicate to a user certain operational states of a television receiver.

Further objects of the present invention is to provide an improved muting circuit.

The present invention comprises a tuning detecting circuit, a synchronization detecting circuit, an audio noise detecting circuit, a logic circuit and a muting circuit. According to the present invention, a tuning detecting circuit detects the tuning state (i.e., proper tuning, mistuning and slight mistuning) of the local oscillator. The detecting circuit receives a pair of oppositely phased signals (AFT1, AFT2) from an automatic fine tuning circuit, and generates an output signal indicative of the tuning state of the local ascillator. A synchronization detecting circuit, receiving synchronizing signals and flyback pulses, determines whether the synchronization is maintained; this circuit generates an output signal indicative of the synchronization of the synchronizing signals and the flyback pulses. An audio noise detecting circuit receiving an audio intermediate frequency (IF) signal, detects whether the IF signal includes a noise component, and generates an output signal indicative of the presence of noise. A logic circuit receives the output signals from the tuning, synchronization and audio noise detecting circuits. Depending on the operational states, the logic circuit generates either a first output signal, a second output signal, or a third output signal.

The objects and advantages of the present invention will become apparent to persons skilled in the art from a study of the following description and the accompanying drawings.

DESCRIPTION OF THE PREFERRED EMBODIMENT

The present invention will be described in detail with reference to the accompanying drawings.

Figure 1:
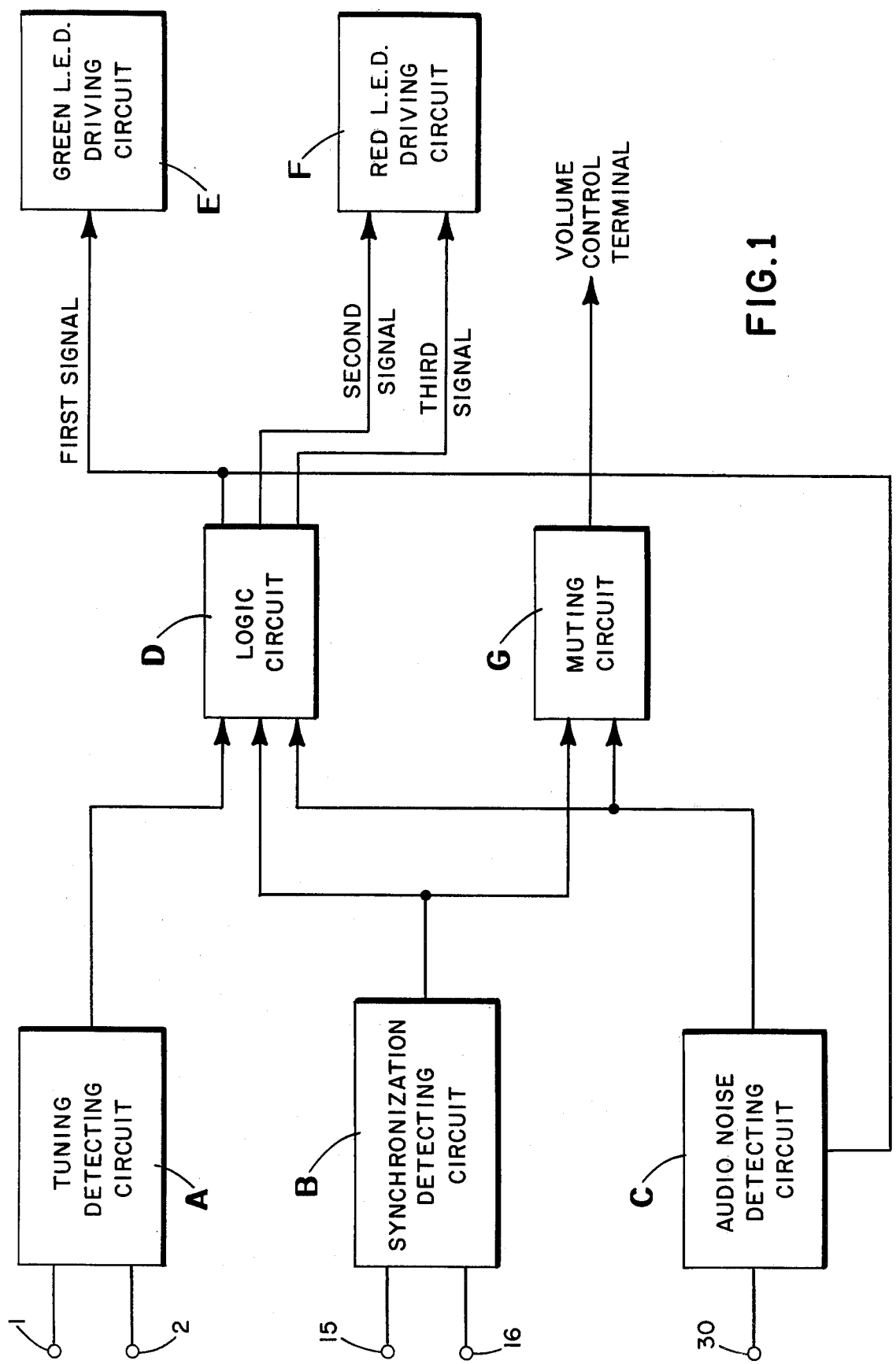
FIG. 1 is a block diagram of a circuit for detecting and improving the operational state of a television receiver according to the present invention.

Referring to FIG. 1, the operation of the circuit according to the present invention will be described. Tuning detecting circuit A, having a pair of input terminals 1, 2, receives detected signals AFT1, AFT2 from an automatic fine tuning (AFT) circuit (not shown). Signals AFT1 and AFT2 have an S-shaped characteristic curve and are in opposite phase with respect to each other. Circuit A functions to detect in which region the tuner is operating and supplies the detected output to a logic circuit D. The detected output signal indicates that the tuner is properly tuned, mistuned or slightly mistuned. A synchronization detecting circuit B, having a pair of input terminals 15, 16, receives a flyback pulse and a horizontal synchronizing signal. Circuit B functions to detect whether the horizontal synchronization is maintained. That is, circuit B detects whether both the flyback pulse and the horizontal synchronizing signal are synchronized and supplies an output signal indicative of the synchronization between these signals to logic circuit D and a muting circuit G. An input terminal 30 of an audio noise detecting circuit C receives an audio intermediate frequency (IF) signal having two different bands, as discussed below. Circuit C detects whether the audio IF signal includes a noise component, and supplies an output indicative of the presence of noise to logic circuit D and muting circuit G.

Except as stated below, logic circuit D generates a first output signal when the tuner operates in the proper tuning region (i.e., the tuner is properly tuned), and supplies a first output signal to a driving circuit E for continuously activating a green light-emitting diode. The first output signal is also supplied to circuit C to prevent its operation; as a result, the output signal from circuit C will indicate no noise. Except as stated below, logic circuit D generates a second output signal when the tuner operates in the slight mistuning region, and supplies the second output signal to a driving circuit F for continuously activating a red light-emitting diode. When the tuner operates in the mistuning region, logic circuit D generates a pulsed third output signal, and supplies the third output signal to the red light-emitting diode. The pulsed third output signal will also be generated if horizontal synchronization is not maintained; this is the case even if the local oscillator is operating in the proper tuning or slight mistuning region. Furthermore, the pulsed third output signal will also be generated if the audio noise is present provided the tuner is operating either in the slight mistuning or mistuning region.

Circuit G functions to mute the sound from the loudspeaker when the horizontal synchronization is not maintained and/or the audio noise is present.

Figure 2A:
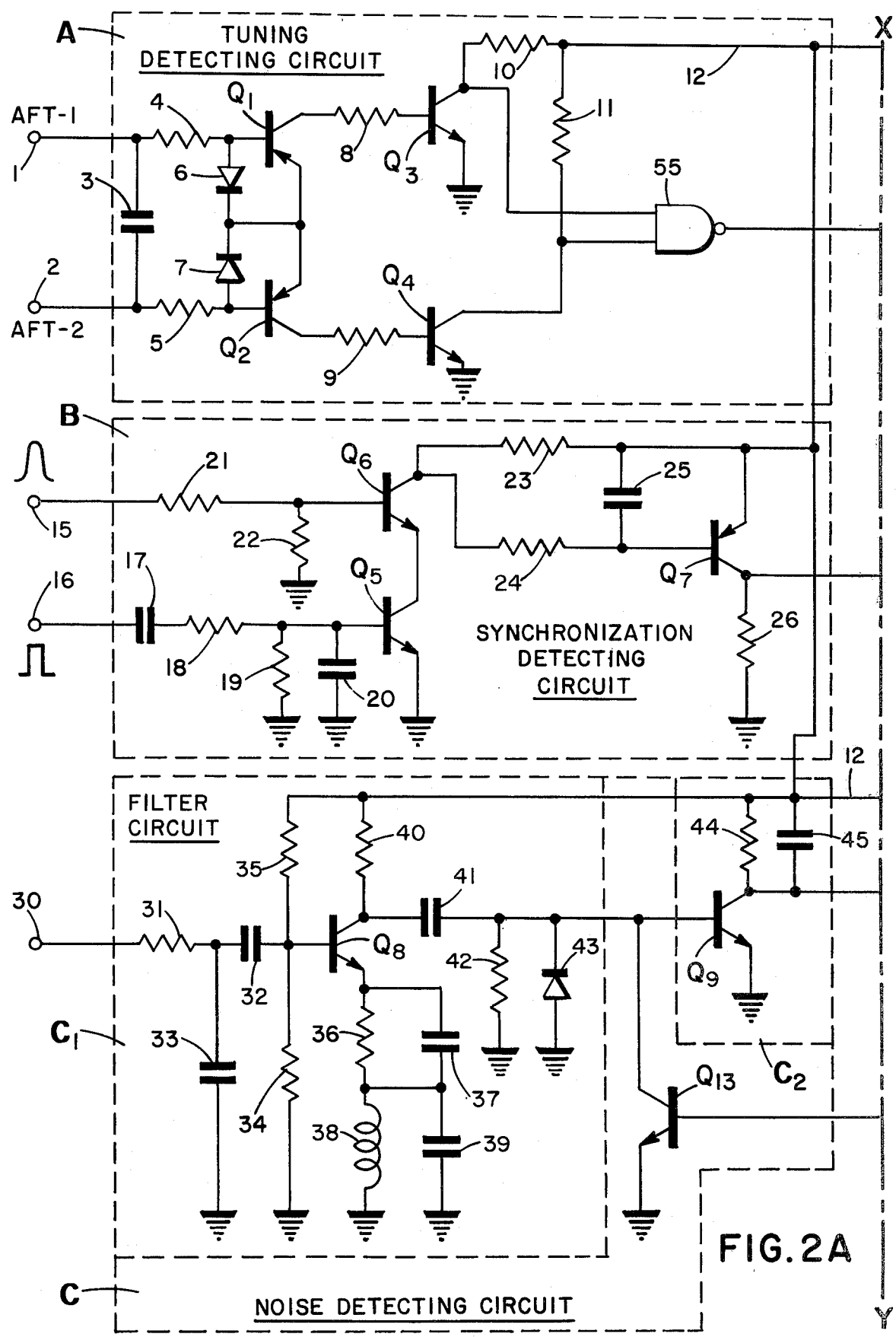
FIGS. 2A and 2B are detailed circuit diagrams of FIG. 1.
Figure 2B:
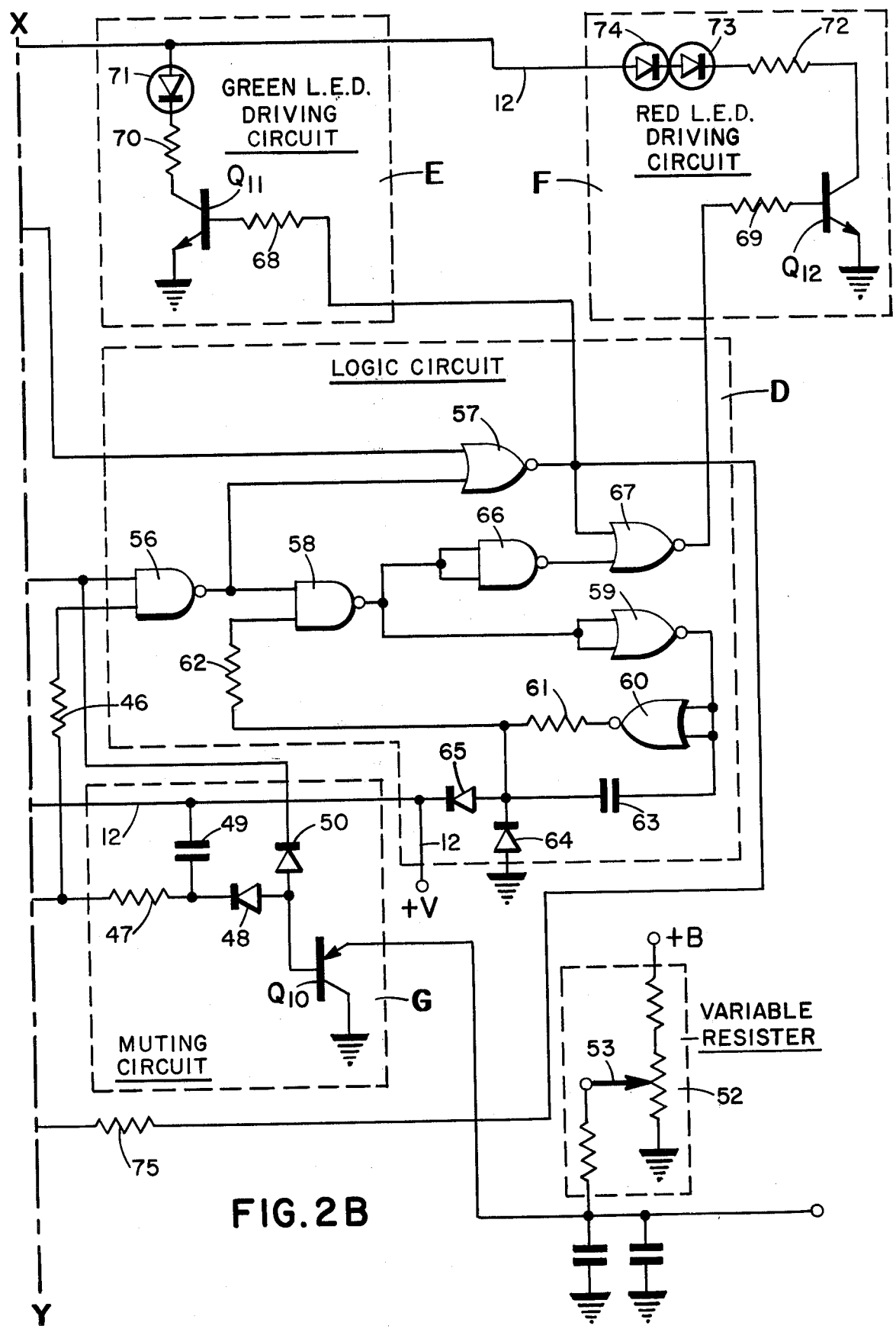

Next, referring to FIGS. 2 and 3, the details of the block diagram of FIG. 1 will be described. A pair of input terminals 1, 2 of tuning detecting circuit A receive the detected signals AFT1, AFT2 (see FIG. 3(a)) from an automatic fine tuning (AFT) circuit (not shown). Signals AFT1 and AFT2 have an S-shaped characteristic curve and are in opposite phase with respect to each other. Input terminal 1 is connected, via a resistor 4, to the base electrode of a transistor Q1. Input terminal 2 is connected to input terminal 1 through a condenser 3 and to the base electrode of a transistor Q2 through a resistor 5. The emitter electrode of transistor Q2 is connected to the emitter electrode of transistor Q1 and to the cathode electrodes of diodes 6, 7. The anode electrodes of diodes 6, 7 are respectively connected to the base electrodes of transistors Q1, Q2. The collector electrode of transistor Q1 is connected, through a resistor 8, to the base electrode of a transistor Q3, while the collector electrode of transistor Q3 is connected to a power supply line 12 through a resistor 10. The emitter electrode of transister Q3 is grounded. The collector electrode of transistor Q2 is connected, through a resistor 9, to the base electrode of a transistor Q4, while the collector electrode of transistor Q4 is connected to line 12 through a resistor 11. The emitter electrode of transistor Q4 is grounded. The collector electrodes of transistors Q3, Q4 are connected to a pair of input terminals of a NAND circuit 55.

When the tuner operates in the proper tuning region (i.e., region F1 in FIG. 3), signals AFT1, AFT2 are in the vicinity of the center point F0 of the S-shaped curve. Therefore, transistors Q1 to Q4 are cut off, and the collector potentials of transistor Q3, Q4 are at the high level (1) (i.e., region F1 in FIGS. 3(b) and (c)). Consequently, the output signal (i.e., region F1 in FIG. 3(d)) of circuit 55 (i.e., circuit A) are at the low level (0). When the tuner operates in the slight mistuning region (i.e., region F2 in FIG. 3), signal AFT1 is at the upper flat portion of the S-shaped curve, while signal AFT2 is at its lower flat portion. The slight mistuning region F2 represents slight deviations from proper tuning on the lower side. While operating in this region, transistors Q1, Q3 are cut off and the collector potential of transistor Q3 is at the high level (1), while transistors Q2, Q4 conduct and the collector potential of transistor Q4 is a low level (0), (i.e., region F2 in FIGS. 3(b) and (c)). Consequently, the output signal (i.e., region F2 in FIG. 3(d)) of circuit 55 has a high level (1). When the tuner operates in the slight mistuning region (i.e., region F2' in FIG. 3), signal AFT1 are at the lower flat portion of the S-shaped curve, while signal AFT2 are at its upper flat portion. The slight mistuning region F2' represents slight deviations from proper tuning on the upper side. While operating in this region, transistors Q1, Q3 conduct and the collector potential of transistor Q3 is at a low level (0), while transistors Q2, Q4 are cut off and the collector potential Q4 is at a high level (1), (i.e., region F2' in FIGS. 3(b) and (c)). Consequently, the output signal (region F2' in FIG. 3(d)) of circuit 55 is at a high level (1).

When the tuner operates in the mistuning region (i.e., regions F3 and F3' in FIG. 3), which far deviates, both signals AFT1 and AFT2 become zero. Mistuning regions F3 and F3' represent significant deviations from the proper tuning region on the lower and upper sides (i.e., below $-2$ MHz and above $+1.5$ MHz near the proper tuning point F1. Therefore, transistors Q1 to Q4 are cut off and the collector potential of each transistor Q3, Q4 are at a high level (1) (i.e., regions F3 and F3' in FIGS. 3(b) and (c)). Consequently, the output signal (i.e., regions F3 and F3' in FIG. 3(d)) of circuit 55 is at a low level (0).

As a result, tuning detecting circuit A generates an output signal having a low level if proper tuning (i.e., region F1), a high level if slight mistuning (i.e., region F2 and F2'), and a low level if mistuning (i.e., region F3 and F3').

Synchronization detecting circuit B has a pair of input terminals 15, 16 which receive the flyback pulse and the horizontal synchronizing signal. Flyback pulse input terminal 15 is connected, through a resistor 21, to the base electrode of a transistor Q6. The base electrode of transistor Q6 is grounded through a resistor 22, whereby the combination of resistors 21, 22 constitute a damping circuit. Horizontal synchronizing signal input terminal 16 is connected to the base electrode of a transistor Q5 through a serially connected circuit comprising condenser 17 and resistor 18. The base electrode of transistor Q5 is grounded through a parallel circuit comprising resistor 19 and condenser 20. Resistors 18, 19 and condensers 17, 20 constitute a filter circuit which only passes a signal of approximately 15.7 KHz. The emitter electrode of transistor Q5 is grounded, while its collector electrode is connected to the emitter electrode of transistor Q6. The collector electrode of transistor Q6 is connected to power supply line 12 through a resistor 23, and to the base electrode of a transistor Q7 through a resistor 24. The base electrode of transistor Q7 is connected to line 12 through a condenser 25. Resistors 23, 24 and condenser 25 constitute a smoothing circuit. The emitter electrode of transistor Q7 is connected to line 12, while its collector electrode is grounded through a resistor 26. The output signal of circuit B is supplied from the collector electrode of transistor Q7 to logic circuit D and muting circuit G.

Transistors Q5, Q6 in synchronization detecting circuit B function as an AND circuit. Therefore, when input terminals 15, 16 simultaneously receive both the flyback pulse and the horizontal synchronizing signal, transistors Q5 to Q7 conduct and the collector potential of transistor Q7 rises to a high level (1), as shown in FIG. 3(e). However, when input terminals 15, 16 receive only the flyback pulse or the horizontal synchronizing signal, transistors 15 to 17 are cut off and the collector potential of transistor Q7 falls to ground potential (i.e., a low level (0)), as shown in FIG. 3(e). As a result, the output signal of synchronizing detecting circuit B has a high level (1) when horizontal synchronization is maintained, and a low level (0) when not maintained. In general, when the tuner operates under $-4$ MHz and over $+1$ MHz around the just tuning point f0, the horizontal synchronization is not maintained.

Figure 6:
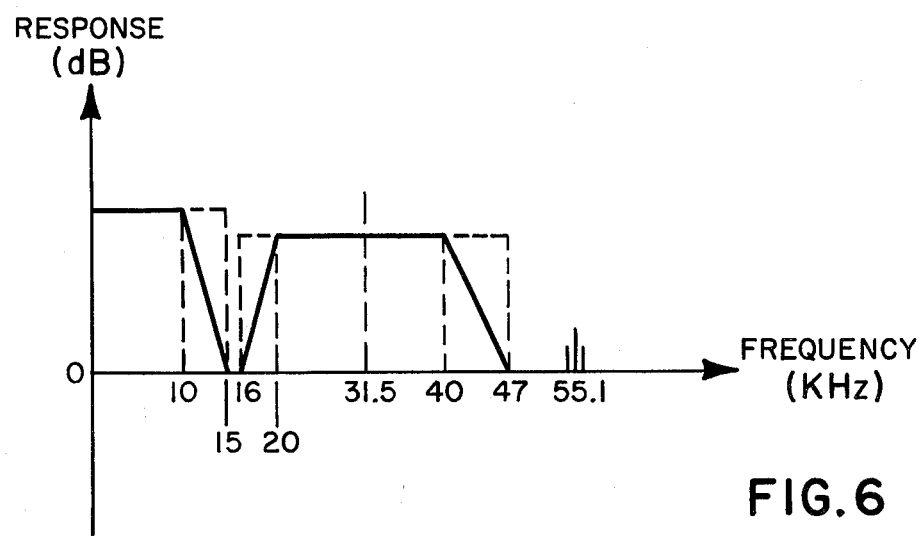
FIG. 6 shows the frequency characteristic of the intermediate frequency (IF) signal applied to the input of the noise detecting circuit C in FIG. 2.

An input terminal 30 of audio noise detecting circuit C receives the audio IF signal (see FIG. 6). The audio IF signal is utilized for either sterophonic or bilingual program; it has two bands, namely, from 0 to 15 KHz and from 16 to 47 KHz. Circuit C comprises a filter circuit C1 and a noise detecting circuit C2. Input terminal 30 is connected, via serially connected resistor 31 and condenser 32, to the base electrode of a transistor Q8. The connection point of resistor 31 and condenser 32 is grounded through a condenser 33. The base electrode of transistor Q8 is connected to line 12 through a resistor 35 and to ground via resistor 34. Its emitter electrode is grounded through a first parallel circuit of a resistor 36 and a condenser 37 and a second parallel circuit of a coil 38 and a condenser 39, while its collector electrode is connected to line 12 through a resistor 40. Its collector electrode is also connected to the cathode electrode of a diode 43 through a condenser 41. The anode of diode 43 is grounded. A resistor 42 is connected in parallel with diode 43.

The cathode electrode of diode 43 is connected to the base electrode of the transistor Q9 which forms part of noise detecting circuit C2. The emitter electrode of transistor Q9 is grounded, while its collector electrode is connected to line 12 through a parallel circuit of resistor 44 and condenser 45. The collector electrode of transistor Q9 is also connected to muting circuit G and, via resistor 46, to logic circuit D.

The two parallel circuits in filter circuit C1, comprising resistor 36, coil 38 and condensers 37 and 39, have a following total impedance Z:

$$Z = \frac{1 - \omega^2 L (C37 + C39)}{j\omega \, C37 \, (1 - \omega^2 C39)};$$

wherein C37 is the capacitance of condenser 37, C39 is the capacitance of condenser 39 and L is the inductance of coil 38. These two parallel circuits have the following parallel resonant frequency (f1) and the serially resonant frequency (f2):

$$f1 = \frac{1}{2\pi \sqrt{L \, C39}}$$

$$f2 = \frac{1}{2\pi \sqrt{L(C37 + C39)}}$$

Figure 4:
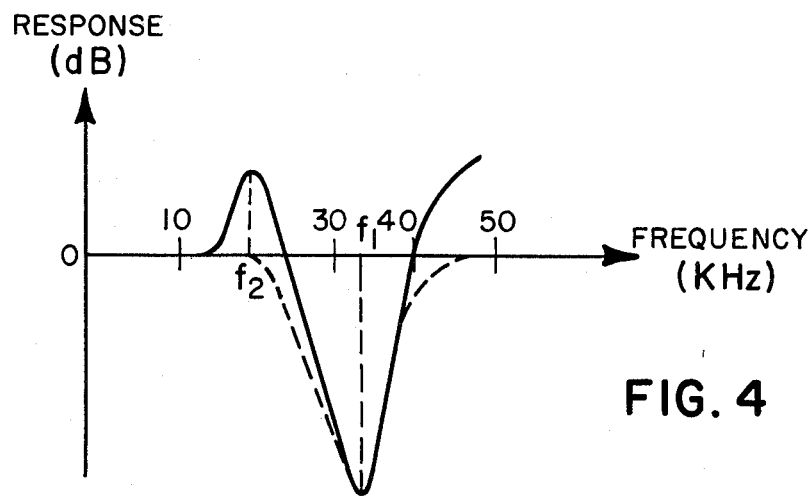
FIG. 4 shows the frequency characteristic of the signal between the base and collector electrodes of transistor Q8 in FIG. 2.
Figure 5:
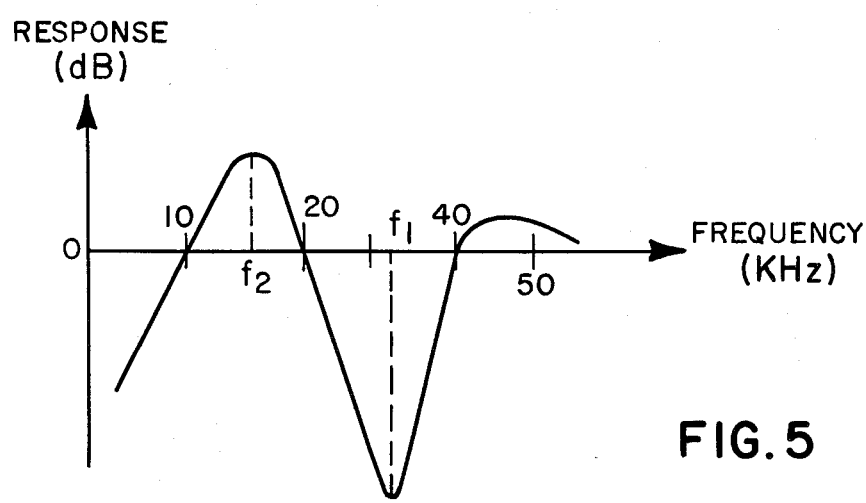
FIG. 5 shows the frequency characteristic of the signal between input and output terminals of filter circuit C1 in FIG. 2.

It is assumed that C37, C39 and L are selected so that f1 is two times the horizontal synchronizing frequency (i.e., approximately 31.5 KHz) and f2 is lower than f1. The frequency characteristic of the signal between the base and collector electrodes of transistor Q8 is shown in FIG. 4. The dotted line in FIG. 4 shows the frequency characteristic between the base and collector electrode of transistor Q8, assuming that condenser 37 is removed. Further, a total frequency characteristic of circuit C1, namely, from input terminal 30 to the cathode electrode of diode 43 is shown in FIG. 5. As shown by FIG. 5, circuit C1 passes only the IF signal which has a first determinate bandpass (i.e., 10 to 20 KHz) and a second determinate bandpass (i.e., above 40 KHz). FIG. 6 shows the audio signal frequency characteristic which has a first frequency band (i.e., 0–15 KHz) and a second frequency band (i.e., 16–47 KHz). As shown in FIG. 6, the audio information, supplied to the input 30 of circuit C1, is substantially reduced in these two determinate bands. That is, the audio signal is reduced from 10 to 20 KHz and above 40 KHz, while the noise level is significantly increased. Consequently, circuit C1 will pass a relatively greater amount of the noise component which is present within these two determinate bands.

The IF signal passed by circuit C1 is supplied to the base electrode of transistor Q9 of circuit C2. If the IF signal does not contain a noise component, transistor Q9 is cut off. If the IF signal, however, includes a noise component, transistor Q9 conducts. Consequently, transistor Q9 detects whether noise is present. After the detected signal is smoothed by the parallel circuit comprising resistor 44 and condenser 45, it is supplied to logic circuit D and muting circuit G. As a result, circuit C supplies a high level (1) output signal when audio noise is not present, and a low level (0) output signal when audio noise is present, as shown in FIG. 3(f).

Usually, when the tuner operates below −1.5 MHz and above 3 MHz near the proper tuning point f0, the audio IF signal will include a noise component.

Since transistor Q9 merely detects the signal in the narrow bands (i.e., 10–20 KHz; +40 KHz), its cutoff frequency need not be large. Accordingly, transistor Q9 will not generate a harmonic frequency which causes a periodic interruption of the raster. Further, transistor Q9 detects bands in which the noise component is apt to be superimposed on the IF signal. Accordingly, the noise detecting circuit C in combination with the muting circuit G achieves a superior squelch circuit. The frequency characteristic of the noise detecting circuit shown in FIGS. 2 and 5 permits its usage with stereophonic and bilingual progams. It can also be modified to permit its usage with monophone programs.

In muting circuit G, an output signal (FIG. 3(f)) from audio noise detecting circuit C is supplied, through a resistor 47 and diode 48, to the base electrode of transistor Q10. The cathode electrode of diode 48 is connected, through a condenser 49, to line 12. The base electrode of transistor Q10 is connected, via diode 50, to the collector electrode of transistor Q7 in synchronization detecting circuit B. The collector electrode of transistor Q10 is grounded, while its emitter electrode is connected to a slider 53 of a variable resistor 52 and to a gain control terminal of a volume control circuit (not shown).

Diodes 48 and 50 function as an OR circuit. Therefore, when audio noise is present or horizontal synchronization is not maintained (i.e., the output signal of either circuit B or circuit C is at a low level (0)), transistor Q10 conducts. Conduction of transistor Q10 causes the potential at the gain control terminal of the volume control circuit to fall to the ground level, and the muting operation is achieved.

In logic circuit D, a pair of input terminals of NAND circuit 56 receive output signals (i.e., FIGS. 3(e) and (f)) of synchronization detecting and audio noise detecting circuits B, C. An output signal of circuit 56 is supplied to one input terminal of NOR circuit 57, while the other input terminal of circuit 57 receives an output signal (i.e., FIG. 3(d)) of tuning detecting circuit A. An output signal of circuit 57 is supplied, through a resistor 68, to the base electrode of a transistor Q11 in driving circuit E. The collector electrode of transistor Q11 is connected, through a resistor 70 and a green light-emitting diode 71, to level 2.

The output signal of circuit 56 is also supplied to one input terminal of a NAND circuit 58. An output signal of circuit 58 is supplied to a pair of input terminals of a NAND circuit 66. An output signal of circuit 66 is supplied to one input terminal of a NOR circuit 67, while the other input terminal of circuit 67 receives the output signal of circuit 57. An output signal of circuit 67 is supplied, through a resistor 69, to the base electrode of a transistor Q12 in driving circuit F. The collector electrode of transistor Q12 is connected, through a resistor 72 and red light-emitting diodes 73 and 74, to line 12, while the emitter electrode of transistor Q12 is grounded.

The output signal of NAND circuit 58 is also supplied to a pair of input terminals of a NOR circuit 59, while circuit 50 supplies an output signal to a pair of input terminals of a NOR circuit 60. An output signal of circuit 60 is supplied, through resistors 61, 62, to the other input terminal of circuit 58. The connection point of resistors 61, 62 is connected, through a condenser 63, to the input terminals of circuit 60. This connection point is coupled to the ground through a diode 64, and through a diode 65, to line 12. A loop comprising NAND circuit 58 and NOR circuits 59, 60 functions as an astable multivibrator. A oscillation frequency of this multivibrator is adjusted by the values selected for condenser 63 and resistor 61.

The output signal of NOR circuit 57 is also supplied, via a resistor 75, to the base electrode of a transistor Q13. The collector electrode of transistor Q13 is connected to the base electrode of transistor Q9, while its emitter electrode is grounded.

The operation of logic circuit D will now be discussed. It is assumed that the tuner operates in the proper tuning region F1, the horizontal synchronization is maintained, and audio noise is not present. Circuit A supplies a low level (0) signal (i.e., region F1 in FIG. 3(d)) to the other input terminal of NOR circuit 57, while circuits B and C supply high level (1) signals (i.e., region F1 in FIGS. 3(e) and (f)) to the input terminals of NAND circuit 56. As a result, circuit 56 supplies a low level (0) output signal (i.e., region F1 in FIG. 3(g)), to the one input terminal of circuit 57, and to the one input terminal of circuit 58. Circuit 57 supplies a high level (1) output signal (i.e., region F1 in FIG. 3(h)) through resistor 68, to the base electrode of transistor Q11 in driving circuit E; circuit 57 also supplies this high level signal to the other input terminal of circuit 67. Consequently, transistor Q11 conducts and drives LED 71, which emits green light.

Since circuit 58 receives a low level signal from circuit 56, it supplies a high level (1) output signal to the input terminals of circuit 66, irrespective of the level of the signal supplied to its other input terminal. Circuit 66 supplies a low level (0) output signal to the one input terminal of circuit 67, while the other input terminal of circuit 67 receives the high level (1) signal from circuit 57. Consequently, circuit 67 supplies a low level output signal (i.e., region F1 in FIG. 3(i)), via resistor 69, to the base electrode of transistor Q12, in driving circuit F. Transistor Q12, therefore, is cut off and does not drive LEDS 73, 74 to emit red light.

The high level output signal from circuit 57 is supplied, through resistor 75, to the base electrode of transistor Q13. Since transistor Q13 conducts, the base potential of transistor Q9 falls to ground level which cuts off transistor Q9. As a result, the muting operation does not occur, even if the IF signal contains a noise component. Consequently, audio sound is generated from the loudspeaker. This assumes that the tuner is operating in the proper tuning region and horizontal synchronization is maintained.

When, however, horizontal synchronization is not maintained, even if the tuner operates in the proper tuning region, devices 73, 74 intermittently emit red light and muting occurs, as will be explained below. Since circuit B produces a low level (0) output signal, NAND circuit 56 supplies a high level output signal to circuit 57 and 58. Therefore, circuit 57 supplies a low level (0) output signal to transistor Q11. As a result, transistor Q11 is cut off and diode 71 does not emit green light. Further, since the one input terminal of circuit 58 receives a high level signal, NAND circuit 58 supplies an output signal depending upon the level of its other input signal. As previously discussed, the level of the other input signal of NAND circuit 58 is a pulsed waveform caused by the astable multivibrator comprising circuit 58, 59 and 60. In response to the oscillation operation of this multivibrator, circuits 66 and 67 supply an output signal level which is alternately high and low. Therefore, transistor Q12 alternately conducts which produces intermitent operation of diodes 73, 74.

Further, since NOR circuit 57 produces a low level output signal, transistor Q13 is not cut off. Accordingly, circuit C operates normally. Even if the audio noise does not exist, the muting operation is done as mentioned above while the horizontal synchronization is not maintained.

Next, it is assumed that the tuner operates in the slight mistuning region (i.e., regions F2 and F2' in FIG. 3), the horizontal synchronization is mentioned, and audio noise is not present. NAND circuit 55 supplies the high level (1) output signal (i.e., region F2 and F2' in FIG. 3(d)) to the other input terminal of circuit 57. Since high level signals are supplied from circuits B and C, circuit 56 supplies a low level output signal (i.e., region F2 and F2' in FIG. 3(g)) to the one input terminal of circuit 57 and to circuit 58. Therefore, circuit 57 supplies a low level (0) output signal to transistor Q11. As a result, transistor Q11 is cut off and LED 71 is not activated to emit green light. Circuit 58 supplies a high level (1) output signal to the input terminals of circuit 66 irrespective of the level of the signal supplied to the other input terminal of circuit 58. Circuit 66 supplies a low level (0) output signal to the one input terminal of circuit 67. Since circuit 67 receives the low level (0) signal from circuit 57, circuit 67 supplies a high level (1) output signal (i.e., retions F2 and F2' in FIG. 2(i)) to transistor Q12. As a result, transistor Q12 conducts and LEDS 73, 74 emit red light.

Further, since NOR circuit 57 supplies a low level (0) output signal to transistor Q13, transistor Q13 is cut off. Therefore, audio noise detecting circuit C operates normally.

Furthermore, when the horizontal synchronization is not maintained and/or audio noise is present (i.e., especially below −1.5 MHz and above +1 MHz near the proper tuning point f0 in regions F2 and F2'), the muting operation is performed and logic circuit D operates as follows. NAND circuit 56 receives a low level (0) signal or two low level (0) signals and supplies a high level (1) output signal to circuit 57. Since circuit 57 also receives a high level (1) signal, from NAND 55, it supplies a low level (0) output signal to transistor Q11. As a result, LED 71 is not activated to emit green light. Since circuit 58 receives a high level (1) signal, it supplies an output signal dependent upon the level of its other input signal. As previously discussed, the level of the other input signal of NAND circuit 58 is a pulsed waveform caused by the astable multivibrator comprising circuits 58, 59 and 60. Therefore, circuit 66 supplies, to circuit 67, an output signal level which is alternately high and low. Circuit 67 also supplies, to transistor Q12, an output signal level which is alternately high and low. Consequently, LEDS 73 and 74 intermittently emit red light.

Figure 3:
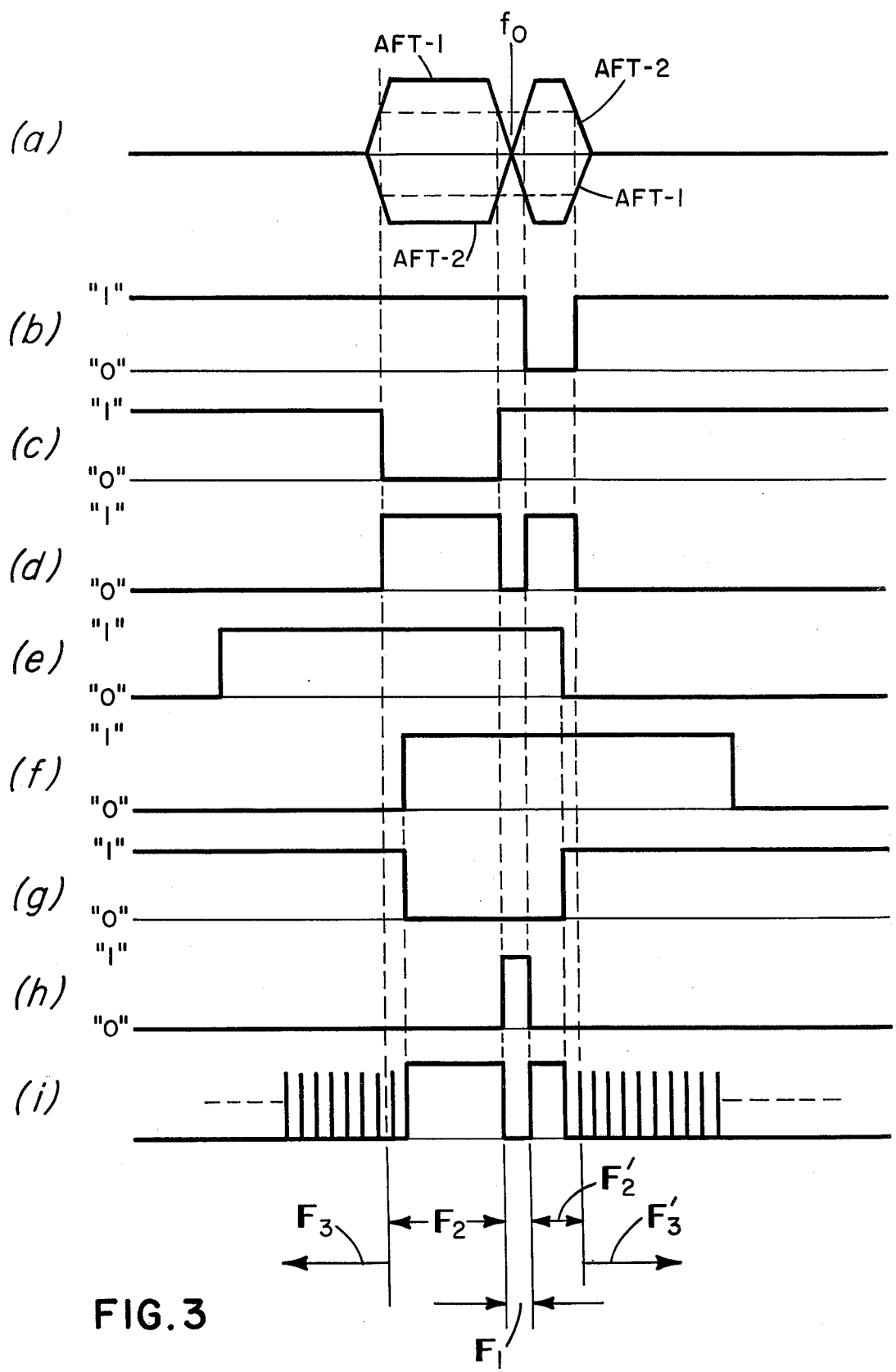
FIG. 3 is a waveform chart showing the signals at various points of the circuit of FIG. 2.

Next, it is assumed that the tuner operates in the mistuning region (i.e., regions F3 and F3' in FIG. 3). Circuit A supplies a low level (0) output signal (i.e., regions F3 and F3' in FIG. 3(d)) to the other input terminal of NOR circuit 57. In general, if mistuning exists, horizontal synchronization is not maintained and/or the audio noise is present. Therefore, NAND circuit 56 receives one low level (0) signal or two low level signals and supplies a high level (1) output signal (i.e., regions F3 and F3′ in FIG. 3(g)) to one input terminal of NOR circuit 57. NOR circuit 57 supplies a low level (0) signal (i.e., region F3 and F3′ in FIG. 3(h)) to transistor Q11. As a result, LED 71 is not activated.

Since NAND circuit 58 receives a high level (1) signal from circuit 56, the loop comprising circuits 58, 59, 60 function as an astable multivibrator. As mentioned above, circuit 67 supplies to transistor Q12, an output signal level (i.e., regions F3 and F3′ in FIG. 3(i)), which is alternately high and low. As a result, LEDS 73, 74 intermittently emit red light.

Although illustrative embodiment of the invention has been described in detail with reference to the accompanying drawings, it is to be understood that the invention is not limited to the precise embodiment and that various changes and modifications may be effected therein by one skilled in the art without departing from the scope or spirit of the invention.

I claim:

1. A circuit for detecting the operational states of a television receiver, said circuit comprising:

tuning detecting circuit means, responsive to a detected signal from an automatic fine tuning circuit, for detecting whether a tuner is operating in a proper tuning region, a slight mistuning region, or a mistuning region, and generating a tuner detecting output signal indicative of the region of tuner operation;

synchronization detecting circuit means, responsive to a synchronizing signal and a flyback pulse, for detecting whether the synchronization is maintained, and generating a synchronization detecting output signal indicative of the maintenance of synchronization;

audio noise detecting circuit means, responsive to an audio intermediate frequency signal, for detecting whether said audio signal includes a noise component and generating a noise detecting output signal indicative of the presence of said noise component;

and logic circuit means, responsive to said tuner detecting output signal, said synchronization detecting output signal and said noise detecting output signal, for generating a first output signal when said tuner is operating in said proper tuning region, a second output signal when said tuner is operating in said slight mistuning region, and, a third output signal when said tuner is operating in said mistuning region, wherein said first, second and third output signals represent said operational states, said logic circuit means further includes means for preventing the generation of said first and second output signals and for generating said third output signal whenever said synchronization is not maintained.

2. The circuit of claim 1 comprising:

a first driving circuit means, responsive to said first output signal, for driving a first light-emitting device;

and a second driving circuit means, responsive to said second and third output signals, for driving a second light-emitting device, said third output signal having alternate high and low levels for intermittently driving said second light emitting device.

3. A circuit for detecting the operational states of a television receiver, said circuit comprising:

tuning detecting circuit means, responsive to a detected signal from an automatic fine tuning circuit, for detecting whether a tuner is operating in a proper tuning region, a slight mistuning region, or a mistuning region, and generating a tuner detecting output signal indicative of the region of tuner operation;

synchronization detecting circuit means, responsive to a synchronizing signal and a flyback pulse, for detecting whether the synchronization is maintained, and generating a synchronization detecting output signal indicative of the maintenance of synchronization;

audio noise detecting circuit means, responsive to an audio intermediate frequency signal, for detecting whether said audio signal includes a noise component and generating a noise detecting output signal indicative of the presence of said noise component;

and logic circuit means, responsive to said tuner detecting output signal, said synchronization detecting output signal and said noise detecting output signal for generating a first output signal when said tuner is operating in said proper tuning region, a second output signal when said tuner is operating in said slight mistuning region, and, a third output signal when said tuner is operating in said mistuning region, wherein said first, second and third output signals represent said operational states; and a first driving circuit means, representative to said first output signal, for driving a first light-emitting device;

and a second driving circuit means, responsive to said second and third output signals, for driving a second light-emitting device, said third output signal having alternative high and low levels for intermittently driving said second light-emitting device.

4. A circuit for detecting the operational states of a television receiver, said circuit comprising:

tuning detecting circuit means, responsive to a detected signal from an automatic fine tuning circuit, for detecting whether a tuner is operating in a proper tuning region, a slight mistuning region, or a mistuning region, and generating a tuner detecting output signal indicative of the region of tuner operation;

synchronization detecting circuit means, responsive to a synchronizing signal and a flyback pulse, for detecting whether the synchronization is maintained, and generating a synchronization detecting output signal indicative of the maintenance of synchronization;

audio noise detecting circuit means, responsive to an audio intermediate frequency signal, for detecting whether said audio signal includes a noise component and generating a noise detecting output signal indicative of the presence of said noise component;

and logic circuit means, responsive to said tuner detecting output signal, said synchronization detecting output signal and said noise detecting output signal for generating a first output signal when said tuner is operating in said proper tuning region, a second output signal when said tuner is operating in said slight mistuning region, and, a third output signal when said tuner is operating in said mistuning region, wherein said first, second and third output signals represent said operational states; and a muting circuit, responsive to said noise detecting output signal and coupled to a loudspeaker which generates sound for muting the sound when said audio signal includes said noise component.

5. The circuit of claim 4 wherein said muting circuit is also responsive to said synchronization detecting output signal to mute said sound when said synchronization is not maintained.

6. A circuit for detecting the operational states of a television receiver, said circuit comprising:
- tuning detecting circuit means, responsive to a detected signal from an automatic fine tuning circuit, for detecting whether a tuner is operating in a proper tuning region, a slight mistuning region, or a mistuning region, and generating a tuner detecting output signal indicative of the region of tuner operation;
- synchronization detecting circuit means, responsive to a synchronizing signal and a flyback pulse, for detecting whether the synchronization is maintained, and generating a synchronization detecting output signal indicative of the maintenance of synchronization;
- audio noise detecting circuit means, responsive to an audio intermediate frequency signal, for detecting whether said audio signal includes a noise component and generating a noise detecting output signal indicative of the presence of said noise component;
- and logic circuit means, responsive to said tuner detecting output signal, said synchronization detecting output signal and said noise detecting output signal for generating a first output signal when said tuner is operating in said proper tuning region, a second output signal when said tuner is operating in said slight mistuning region, and, a third output signal when said tuner is operating in said mistuning region, wherein said first, second and third output signals represent said operational states; wherein said audio signal has a first frequency band and a second frequency band which is separate and distinct from said first band, and wherein said second band is above said first band, and said audio noise detecting circuit comprising:
- filter circuit means for passing said audio signal in a first frequency bandpass extending from an upper end of said first frequency band to a lower end of said second band, and for passing said audio signal in a second bandpass extending above an upper end of said second frequency band;
- and noise detecting means, responsive to said filter circuit, for detecting whether said audio signal includes said noise component.

7. A circuit for detecting the operational states of a television receiver, said circuit comprising:
- tuning detecting circuit means, responsive to a detected signal from an automatic fine tuning circuit, for detecting whether a tuner is operating in a proper tuning region, a slight mistuning region, or a mistuning region, and generating a tuner detecting output signal indicative of the region of tuner operation;
- synchronization detecting circuit means, responsive to a synchronizing equal and a flyback pulse, for detecting whether the synchronization is maintained, and generating a synchronization detecting output signal indicative of the maintenance of synchronization;
- audio noise detecting circuit means, responsive to an audio intermediate frequency signal, for detecting whether said audio signal includes a noise component and generating a noise detecting output signal indicative of the presence of said noise component;
- and logic circuit means, responsive to said tuner detecting output signal, said synchronization detecting output signal and said noise detecting output signal for generating a first output signal when said tuner is operating in said proper tuning region, a second output signal when said tuner is operating in said slight mistuning region, and, a third output signal when said tuner is operating in said mistuning region, wherein said first, second and third output signals represent said operational states; and
- a circuit means responsive to said first output signal, for preventing the operation of said audio noise detecting circuit when said tuner is operating in said proper tuning region.

8. A circuit for detecting the operational states of a television receiver, said circuit comprising:
- tuning detecting circuit means, responsive to a detected signal from an automatic fine tuning circuit, for detecting whether a tuner is operating in a proper tuning region, a slight mistuning region, or a mistuning region, and generating a tuner detecting output signal indicative of the region of tuner operation;
- synchronization detecting circuit means, responsive to a synchronizing signal and a flyback pulse, for detecting whether the synchronization is maintained by comparing the synchronizing signal to said flyback pulse and generating a synchronization detecting output signal indicative of the maintenance of synchronization;
- audio noise detecting circuit means, responsive to an audio intermediate frequency signal, for detecting whether said audio signal includes a noise component and generating a noise detecting output signal indicative of the presence of said noise component;
- and logic circuit means, responsive to said tuner detecting output signal, said synchronization detecting output signal and said noise detecting output signal for generating a first output signal when said tuner is operating in said proper tuning region, a second output signal when said tuner is operating in said slight mistuning region, and, a third output signal when said tuner is operating in said mistuning region, wherein said first, second and third output signals represent said operational states.

* * * * *